US008285728B1

(12) United States Patent
Rubin

(10) Patent No.: US 8,285,728 B1
(45) Date of Patent: Oct. 9, 2012

(54) KNOWLEDGE DISCOVERY AND DISSEMINATION OF TEXT BY MINING WITH WORDS

(75) Inventor: Stuart Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 192 days.

(21) Appl. No.: 12/861,990

(22) Filed: Aug. 24, 2010

(51) Int. Cl.
*G06F 7/00* (2006.01)
*G06F 17/30* (2006.01)
(52) U.S. Cl. ........ 707/749; 707/755; 707/756; 707/770; 707/776; 707/798
(58) Field of Classification Search .................. None
See application file for complete search history.

(56) References Cited

U.S. PATENT DOCUMENTS

| 7,047,226 | B2 | 5/2006 | Rubin | |
|---|---|---|---|---|
| 2003/0182631 | A1* | 9/2003 | Tsochantaridis et al. | 715/531 |
| 2005/0086260 | A1* | 4/2005 | Canright et al. | 707/104.1 |
| 2010/0042603 | A1* | 2/2010 | Smyros et al. | 707/4 |
| 2010/0082333 | A1* | 4/2010 | Al-Shammari | 704/10 |
| 2011/0047166 | A1* | 2/2011 | Stading et al. | 707/749 |

OTHER PUBLICATIONS

S.H. Rubin, Computing with words, IEEE Trans. Syst. Man Cybern. 29 (1999) 518-524.

L.A. Zadeh, From computing with numbers to computing with words—from manipulation of measurements to manipulation of perceptions, IEEE Trans. Ckt. Syst. 45 (1999) 105-119.
W. Pedrycz and S.H. Rubin, Numeric data to information granules and computing with words, in Proc. IEEE Int. Conf. Syst., Man and Cybern., San Antonio, TX, 2009.
R. Solomonoff, "A Formal Theory of Inductive Inference," Inform. Contr., vol. 7, pp. 1-22 and 224-254, 1964.
S.H. Rubin, G. Lee, W. Pedrycz, and S.C. Chen, "Modeling Human Cognition Using a Transformational Knowledge Architecture", Proc. of the IEEE Intl. Conference on System of Systems Engineering (SoSE), Monterey, CA, 2008, IEEE 978-1-4244-2173-2.
G.J. Chaitin, "Randomness and Mathematical Proof," Scientific American, vol. 232, No. 5, pp. 47-52, 1975.
S.H. Rubin, "On Randomization and Discovery," Information Sciences, vol. 177, No. 1, pp. 170-191, 2007.
Non-published patent application entitled Adaptive Case-Based Reasoning System Using Dynamic Method for Knowledge Acquisition, Stuart Rubin, U.S. Appl. No. 12/755,268, filed Apr. 6, 2010.

* cited by examiner

*Primary Examiner* — Giovanna Colan
(74) *Attorney, Agent, or Firm* — Kyle Eppele; Stephen E. Baldwin

(57) ABSTRACT

The present invention enables the construction and deployment of semantic search engines, which learn. Here, the learning necessarily occurs in unsupervised mode given the huge amount of text being searched and the resultant impracticality of providing human feedback. That is, it acquires a lexicon of synonyms and the context for their proper application by searching a moving window of text and compiling the results. No human operator is involved. This allows for the practical search, using machine learning techniques, of very large textual bases.

16 Claims, 2 Drawing Sheets

KNOWLEDGE DISCOVERY AND DISSEMINATION OF TEXT BY MINING WITH WORDS

FEDERALLY-SPONSORED RESEARCH AND DEVELOPMENT

This invention (Navy Case No. 100,547) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

CROSS-REFERENCE TO RELATED APPLICATIONS

This application is related to US Patent Application entitled "Adaptive Case-Based Reasoning System Using Dynamic Method for Knowledge Acquisition", Ser. No. 12/755,268, filed Apr. 6, 2010, which is assigned to the same assignee as the present application, the contents of which are fully incorporated by reference herein.

BACKGROUND

Related prior methods are based on syntactic (e.g., Boolean) search or the use of textual markup languages (e.g., XML). These methods have been incorporated into every major Web and off-line search engine. Syntactic search engines are fine if you know exactly what you are looking for and are sure that the document being searched will use the same syntax. Otherwise, appropriate textual passages will not be returned, which of course runs counter to the prima facia of search itself. Boolean queries here just serve to further constrain the returned results. Textual markup languages allow for efficient semantic search of textual documents, but there is much labor (cost) in manually marking up large corpuses and the evidence is that such markups are very likely to be error prone. Imagine, if you will, the cost and errors associated with any attempt to manually markup the entire Library of Congress as a point of contention.

SUMMARY

The present invention enables the construction and deployment of semantic search engines, which learn. Here, the learning necessarily occurs in unsupervised mode given the huge amount of text being searched and the resultant impracticality of providing human feedback. That is, it acquires a lexicon of synonyms and the context for their proper application by searching a moving window of text and compiling the results. No human operator is involved. This allows for the practical search, using machine learning techniques, of very large textual bases. Existing search engines require an exact or syntactic match of what is being sought—be it through a Boolean query mechanism or otherwise. The present disclosure offers a means to do a semantic search (i.e., a search for text having the same meaning, but not necessarily the same syntax). This may be accomplished today through the use of textual markup languages, such as XML. However, a recent study by Autonomy Corporation revealed that federal workers often make mistakes in the markup of documents (i.e., mis-categorizations) and in any case the use of such markup languages incurs a large and now unnecessary financial burden upon those required to use them.

BRIEF DESCRIPTION OF THE DRAWINGS

Reference is now made to the drawings, where like components are represented by like reference numerals.

DETAILED DESCRIPTION OF THE EMBODIMENTS

Figure 1:
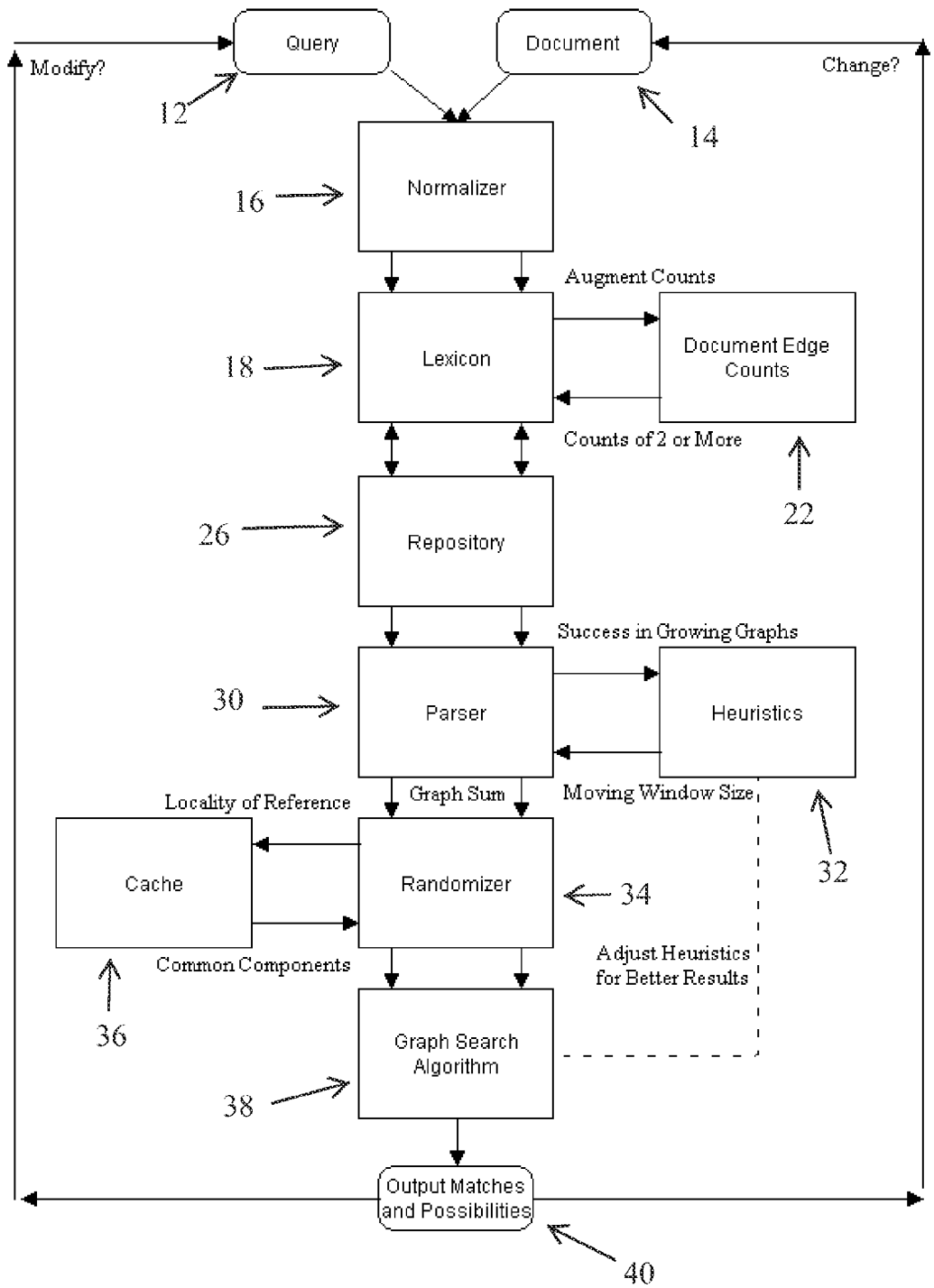
FIG. 1 shows a block diagram of an unsupervised document query system.

One of the unsolved problems, which does not have a closed-form solution, pertains to how to mine free text for needed information. Moreover, the desired solution while necessarily involving machine learning and/or component-based programming because it is not unique, must run in unsupervised mode, as a result of the enormous state space involved. Furthermore, it may not allow for the use of XML or other text markup languages. This follows because not only is the use of such languages error prone according to a recent study by Autonomy Corporation, but their proper use is associated with significant additional costs. While Boolean queries are well-known and simple to accomplish, they suffer in that they are limited to syntactic matches, when in fact semantic matches are often more informative and in any case need to be presented to the user. Also, the proposed system can automatically find the best index terms through concatenation, which unlike competing systems does not rely upon the user to supply the index terms.

Defense monitoring operations involve the decision support provided by several trained analysts. An existing problem is that such analysts currently must painstakingly manually sift through large collections of (translated) documents in order to support or counter their hypotheses pertaining to a situation. Existing search techniques stem from Web search engines and because they are syntactic miners either return too much text, too little text, or return nothing when more often than not a manual reading, where practical, would reveal that the automated search missed what was sought.

To begin, consider the query, "Are terrorists planning to blow up anything in the USA?" Let one of the associated documents contain the text, " . . . Radioactive materials were reported missing yesterday according to FEMA . . . " Is this statement an appropriate reply to the query or not? The answer is that it depends and this is where Computing with Words, Natural Language Processing, and unsupervised machine learning come into play. Clearly, there is no syntactic match and at first this suggests that it would not be of interest. Indeed, most if not all contemporary search engines would report the same.

Expanding the document text may be immediately ruled out due to the time and space required to properly effect this solution. Next, consider the time required to expand the query text, which is a function of the number of semantically equivalent queries that can be had. For example, the original query, "Are terrorists planning to blow up anything in the USA?" has at least the following equivalent semantic forms as well as most queries that might result from a genetic crossover of these and others.

What might insurgents target for demolishment in the United States?
Do we have reason to believe that terrorists are going to explode something in our country?

Are radicals intending to detonate high explosives proximal to something in the USA?

What might terrorists target for explosive violence in America?

Clearly, it is advantageous to generate and process multiple equivalent semantic queries. Indeed, this is done as part of the final solution. However, it is quite a different thing to compile semantically equivalent user queries and to autonomously generate them. The latter is impractical because there can be no generalized protoform for an arbitrary domain in keeping with the results of Newall, Simon, and Shaw's General Problem Solver (GPS), or more theoretically, the dictates of the Incompleteness Theorem of Godel. In other words, set equivalence is context sensitive, where the context may span the full text of the query. What we learn here is that the text of the query and that of the document needs to be "conceptualized" towards the development of a semantic match.

In computational terms, conceptualization may be equated with the root of a semantic graph. Let us go on and read another two sequential sentences in the document being searched. " . . . Radioactive materials were reported missing yesterday according to FEMA. Officials fear that the missing plutonium could be used to make a dirty bomb. The Department of Nuclear Regulatory Safety issued its assurances that a search for the missing materials was underway . . . "

Figure 2:
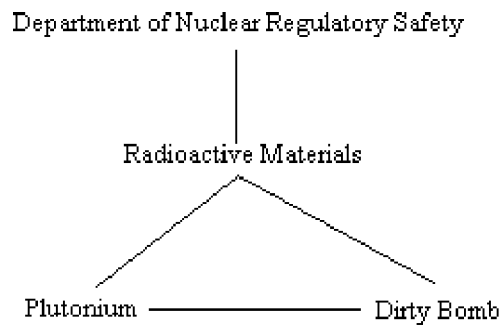
FIG. 2 shows an undirected conceptual graph.

FIG. 2 shows an undirected conceptual graph, with the terms "Department of Nuclear Regulatory Safety", "Radioactive Materials", "Plutonium", and "Dirty Bomb". Now, FIG. 2 is not a semantic graph because it does not have labeled edges between the respective terms shown. It is believed that the labeling could not be had without human intervention, or a great deal of compiled and domain-specific knowledge. Here, the graph was created through associative retrieval within a moving textual window of three (variable) sentences. If this window is too large, then there will be a combinatoric explosion of entries, while if too small, then the resultant graph will be devoid of too many associated conceptual nodes. Such graphs are built using the textual document and a lexicon. The moving window is based on the operating system principle of temporal and spatial locality. See, for example, H. M. Deitel, An Introduction to Operating Systems, Prentice Hall: Upper Saddle River, N.J. 1984.

Given a certain level of expansion, graphs are rank ordered by the number of nodes they share with the query. The greater this number, the better the reply. This defines a possibility of match. Suppose that the next sentence were, "The President stated that he would involve the EPA in finding the missing plutonium." EPA is found to root a new graph though its branches are not realized so far. However, the Department of Regulatory Nuclear Safety and the EPA may be found to be rooted under Congressional Committees. Thus, if a query here were, "Who might we seek help from to curtail a nuclear accident?" then the answer might well come back to seek help from a Congressional Committee—even though this is not to be literally found in the searched document. That is how a human might respond on the basis of background knowledge, which indeed is constructed in computer memory. It is thus proper and fitting that our computer program provide an emulated response.

The problem with such emulated responses is that one needs to go through a lot of unrelated or even improper responses before a proper one is retrieved. This is seen below in visiting the result of queries in rank order. At a fundamental level, we are asking the computer to be creative in ways for which no protoform has been provided in keeping the solution domain general. The only seemingly plausible solution here is to increase the window size with a concomitant near exponential increase in space-time. The hope here is that an increased window might imbue the desired answer in context. Of course, this works, but only within limits.

We have seen some of the ways in which a semantic textual search differs from and improves upon a syntactic textual search. The realization of a semantic textual search involves the following eight fundamental components (at a minimum), as shown in FIG. 1.

1. A Normalizer (16), which in response to a Query 12 about a Document 14 converts the various forms of a word to its normal form, which is defined to be the first form found in the dictionary (e.g., reported→report). Articles are not eliminated because longer vertex labels are assigned higher weights that may also reflect those of the contained articles (e.g., Vitamin A)—see below.
2. A Lexicon (18), which provides synonyms defined by repetition and locality of reference for any normalized word (e.g., radioactive material→plutonium, uranium). Document Edge Counts occur as step 22. The acquisition of a lexicon is discussed below.
3. A Repository (26), which stores and indexes each domain-specific lexicon for a defined window size. It allows the user to customize lexicons for different applications. For example, using the repository the user can fuse a lexicon on high explosives with one on known terrorists to make for a more effective search for terrorists that say have used an explosive such as C4. The dynamically fused lexicon is likely to provide distinct results, using the individual documents, than would be the case otherwise.
4. A Parser (30), which builds an undirected graph using a specified number of sentences (e.g., FIG. 2).
5. Heuristics (32), which take as input the current success in growing graphs and produce as output the size of the moving window for use by the parser.
6. A Randomizer (34), which minimizes required storage and thus search time by removing duplicate subgraphs and embedded subgraphs from storage (e.g., FIG. 2 is embedded in the graph with root, Congressional Committee).
7. A Cache (36), which applies temporal and spatial locality to the speedup of subsequent queries. Multiple forms of the same query, where supplied, are cached to increase the chance of a meaningful reply should any of the saved forms be reused. In this case, the query is successively submitted using all of the forms and results are fused. While users do not necessarily like to supply feedback (i.e., supervised learning), it is natural for them to restate the same query using different syntax in a search to improve results. The cache is maintained using a FIFO methodology.
8. A Graph Search Algorithm (38), which rank orders matching graphs for the query graph(s), if any, on the basis of matching subgraphs (e.g., the work of Tarjan). Efficient search is a paramount concern given the large volumes that may be searched. Graph search generates possibilities for a desired match and uses them to rank order the results of search. The Graph Search Algorithm (38) provides Output Matches and Possibilities (40) back to modify Query (12) and change Document (14).

Consider the document text in the previously illustrated window: " . . . Radioactive materials were reported missing yesterday according to FEMA. Officials fear that the missing plutonium could be used to make a dirty bomb. The Department of Nuclear Regulatory Safety issued its assurances that a search for the missing materials was underway . . . " and its representation in FIG. 2. This gives rise to the question as to how one can acquire a domain-specific lexicon from the scanned document. The answer follows.

Synonyms are not universal in their capability to substitute for a word or phrase. Moreover, one cannot know a priori the contextual situations for which substitution is proper. This means that for the sake of efficiency one needs to be able to tolerate a degree of error in the construction of the undirected graphs and vindicates the following methodology. In one embodiment, new documents must initially be iteratively scanned twice using a fixed window size (e.g., three sentences). In the first pass, the lexicon is created (if not fully supplied by the repository for the desired window size), which further allows for the construction and augmentation of undirected graphs.

Suppose that the sentence, "Both uranium and plutonium are radioactive materials" were encountered (in a query or document). First, all words are reduced to their base form (found in a dictionary) leaving in the window, "uranium, plutonium, radioactive, material". Insignificant words have been omitted here to simplify the example. Next, the list of associations for each word is augmented by the remaining words in the window. The parenthesized number is a counter for the number of instances encountered (over the entire hypothetical document) and is symmetric for singletons. The result here (assuming a window size of one sentence) follows. Note that the text comprising the concatenated vertex labels must be contiguous in the defining sentence.

material {plutonium (4), radioactive (6), uranium (2)}
plutonium {material (4), radioactive (3), uranium (1)}
radioactive {material (6), plutonium (3), uranium (5)}
uranium {material (2), plutonium (1), radioactive (5)}
plutonium radioactive {material (4), uranium (1)}
radioactive material {plutonium (3), uranium (2)}
uranium plutonium {material (2), radioactive (3)}
plutonium radioactive material {uranium (1)}
uranium plutonium radioactive {material (2)}

Words or phrases are excluded from referring to themselves. Then, on the second pass, the edge connecting radioactive materials and plutonium is induced because both are in the same window and have a count of two or more (so as to prevent inclusion due to self-reference). Notice that the nodes of the graph are labeled using the longest descriptor having a count of two or greater. Each edge is assigned a weight. In this case, the discussed edge is given a weight of 3×2. The first number comes from the number of references to radioactive material and plutonium (3), while the second number is the maximum number of words labeling either vertex (2) and serves as a heuristic multiplier (i.e., to favor those labels that are longer, and which necessarily have lower frequency counts overall). If such a heuristic were not used, then one would have to find the maximum among all singletons, consecutive doubletons, consecutive triples, and so on and add one to the result.

This is an exponential process and does not guarantee results at that. The weight of a graph is then the sum of the weights of its edges. This sum is used to rank order the degree to which a graph matches a query graph. In the case presented in FIG. 2, all windows having the words (phrases), "radioactive material, plutonium, dirty bomb, Department of Nuclear Regulatory Safety" in any order is returned among those having the highest weight sums. The possibility of a query result being proper is evaluated relative to the highest numerical result among the requests (i.e., if there are multiple associated equivalent requests as previously described). The algorithm to compute possibilities can be adopted from the above cross-referenced US patent application entitled "Adaptive Case-Based Reasoning System Using Dynamic Method for Knowledge Acquisition" (NC 100,222), the contents of which are fully incorporated by reference herein. Notice that by intersecting with the nodes in the conceptual graph, words or phrases in the query are expanded along symmetric lines. For example, if the query references plutonium, then it implicitly references dirty bomb in FIG. 2 (and vice versa).

A possible enhancement is to include a negative instance mode. For example, in searching for information on laser physics, one might preclude information on laser sailboats by stating, "Not laser sailboats". However, inasmuch as the number of negative instances is thought to be relatively few when searching a domain-specific document, no such capability has been included at this time. Consideration of such is thus left for the out years.

Complexity Analysis:

In this section, we generalize the methodology and provide some indication of its spatial requirements and runtime performance.

A query and a document are a sequence of words, possibly redundant, broken into a sequence of windows, where contiguous sentences form a window and where the number of words in a window may vary from one to the size of the document. A window generally has the size of the query as its lower bound for reasons of efficiency.

Without loss of generality, let the sequence of non-distinct words in a query window be given by $(q_0, q_1, q_2, \ldots, q_n)$. Furthermore, let $(q_{f(0)}, q_{f(1)}, q_{f(2)}, \ldots, q_{f(n)})$ define the normalized words in the query, where f is a total computable function and is defined by $$f(i) = \begin{cases} j, \text{ if such word exists, } j > 0 \\ 0, \text{ otherwise.} \end{cases}$$

A document window is similar to a query window and may be defined as $(d_0, d_1, d_2, \ldots, d_m)$ or $(d_{f(0)}, d_{f(1)}, d_{f(2)}, \ldots, d_{f(m)})$. The choice between the two modes has to do with efficiency. If the cost of computing f(i) is greater than the cost of matching $d_i$ n/2 times (average), where n is defined by the window size and thus n<<100, in general; then, the first form is appropriate. Otherwise, the second form is appropriate. Clearly, a smaller window favors the first form.

Next, the system matches $(q_{f(0)}, q_{f(1)}, q_{f(2)}, \ldots, q_{f(n)})$ against $(d_0, d_1, d_2, \ldots, d_m)$. Every subsequence of the normalized Q is computed and saved. There are a maximum of n(n+1)/2 such subsequences, which is $O(n^2)$. Then, the upper bound on the number of searches in the window of size m, where m≧n is $O(mn^2)$. Note that this can be extremely fast, using parallel processors, where the size of the window is sufficiently limited. Associative hardware or hashing on a serial machine is used to keep track of all edge counts for a serial complexity of $O(cmn^2)$, where c is a relatively small constant.

The repository is a document management system. As such, its operational complexity is $O(n)$ on a serial machine. This is a proven database technology.

Let there be g graphs containing from one to n vertices (i.e., the query size). There can be at most n graphs consisting of a single vertex. Thus, the parser's task is linear in the size of n. This too is entirely tractable.

The optimal window size is determined heuristically. If under direct user control, then the complexity is linear with the number of attempts. If an automatic bisection method is employed, then the complexity is logarithmic in the upper bound. In either case, the net result is tractable.

The randomizer maintains $q_{f(0)}, d_0, q_{f(1)}, d_1, q_{f(2)}, d_2, \ldots,$ $q_{f(p)}, d_p$ in associative memory for all p. Thus, given $O(cn^2)$ space on a serial architecture, where c=2 is a scale factor for efficient hashing, duplicate subgraphs are eliminated—having been stored as their constituent edges, where the edges of an undirected graph, G (V, E), may be connected transitively.

Users may supply the same semantic query in different syntactic forms in an attempt to retrieve the desired result. This is clearly a small linear multiplier, which may be balanced by a linear increase in search time and/or through the use of a sufficient number of parallel/distributed processors—here, up to the maximum number of syntactic forms saved in cache per semantic query.

The Graph Search Algorithm needs to compare the summed edge weights for each window in the document(s). The summing of the edge weights has been accounted for above. Sorting the sums and their associated textual windows is O(cm/2 log m/2) on a serial architecture and O(cm/2) on a sufficiently parallel one (ref. Scientific American offprints circa 1975), where c is a very small constant incurred in the computation of possibilities.

Combining the results above, we have $O(cmn^2)$ for the temporal complexity and $O(cn^2)$ for the spatial complexity on a serial architecture and O(cmn) for the temporal complexity on a linear parallel architecture. Given an appropriate choice of window size, where n<<m, the algorithm can be eminently tractable on either architecture as per design.

Knowledge-Based Decision Support:

Scale is a major cause of complexity. In December 2008, the global monthly Internet traffic was estimated to be five to eight exabytes (1 exabyte=1 billion gigabytes). As of May 2009, the size of the Internet itself has been roughly estimated at 500 exabytes. The proposed project supports decision makers (analysts) by enabling them to more easily find relevant knowledge, while keeping them in the loop in the decision-making process. It also better enables them to focus on the decision at hand.

Figure 3:
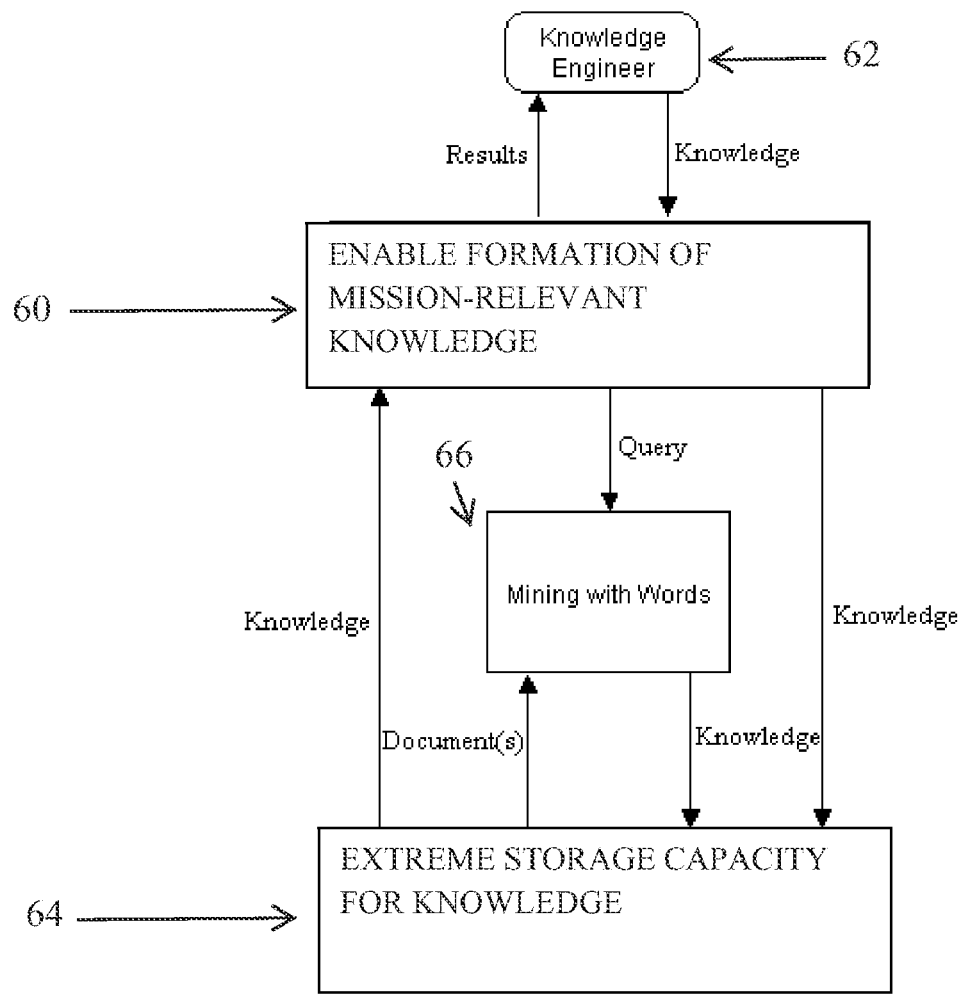
FIG. 3 shows mining with words for decision support.

This project is a candidate for insertion into Raytheon's decision support Confluence™ technology. Confluence™ starts with an explicit model of the mission that identifies data relevant to the mission and relates it to the decisions they support. Their mission model also defines the interactions necessary to implement decisions. While this technology enables the formation of mission-relevant knowledge, another Raytheon technology called RIOT™ provides extreme storage capacity for knowledge, which can be used for decision support operations. We can combine our capability for semantic retrieval with Raytheon Confluence™ and RIOT™ to synthesize only mission-relevant knowledge. Semantic mining greatly reduces the need for manual decision support as brought about by less capable textual search tools. Indeed, their Confluence™ can be modified to also support the query generation process. FIG. 3 presents the tie in, which shows a graph of Mining with Words 66 for decision support, with the Enable Formation of Mission-Relevant Knowledge Block 60 showing the Raytheon Confluence and the Extreme Storage Capacity For Knowledge Block 64 showing the Raytheon RIOT, taken in conjunction with a Knowledge Engineer Block 62.

Computing with Words:

As computational and sensor technologies become ever-more sophisticated, they tend to create a glut of data. A plethora of data can be useful in some record-keeping applications (e.g., aircraft black boxes), but for the majority of applications one needs to convert volumes of passive data into actionable knowledge (e.g., intelligence). Such knowledge has found applications in targeting, logistics, adversarial COA, MDA, satellite imagery, and in all truly autonomous systems.

The reduction of data to knowledge is time critical because the capability for primary memory (PM) storage is currently doubling every 18 months in accordance with Moore's Law. This means that the complexity of information is quadrupling during the same period. The reduction of data to knowledge with or without loss is referred to as randomization. The best way to randomize data for serious applications is to apply knowledge to the randomization process itself. This is termed directed mining by the data mining community and model-based reasoning by others.

Just as towed-sensor arrays employ Markov Chains to enhance the predictive capability of sensed data, Computing with Words can provide a context for extracting meaning from numerical and non-numerical entities alike. For example, there is no purely mathematical technique that can predict that a ships course will not ground it on an intervening island. Using Computing with Words, such knowledge can be represented in a way that would not otherwise be possible. Many pieces of knowledge need to be integrated for the optimization of complex predictions. This requires sophistication in representation, which we humans accomplish using the expressive power of natural language. For example, consider an enemy bombing run and the observation that, "the targets appear to be getting more and more random". Here, Computing with Words is needed to provide the representation for that observation. An enormous capability for randomization is thus provided—addressing the focal need. Whereas numerical analysis uses probabilities to rank likelihoods of an event—Computing with Words uses possibilities to measure certainties, which while similar to probabilities, are fuzzy by nature. Possibilities need not be abstract and are useful in the direction of control mechanisms.

The present invention differs from syntactic search engines in two fundamental ways. First, existing search engines require an exact or syntactic match of what is being sought—be it through a Boolean query mechanism or otherwise. The present disclosure offers a means to do a semantic search (i.e., a search for text having the same meaning, but not necessarily the same syntax). Second, the present disclosure allows for unsupervised learning. That is, it acquires a lexicon of synonyms and the context for their proper application by searching a moving window of text and compiling the results. No human operator is involved. This allows for the practical search using machine learning techniques of very large textual bases.

New features include, but are not necessarily limited to:
a. Provides for automatic learning of lexicons—no need for manual textual markup
b. Realizes semantic search
c. Manually acquires context-sensitive synonyms through aggregation of user queries
d. Allows lexicons to be composed for use from a relational database
e. Lexicons are specific to a selected moving window size, which is the principal determinant of run time
f. Window size may be heuristically determined
g. Allows for tractable search on a serial architecture
h. Can be sped up using parallel and/or distributed processors
i. Allows for multiple documents to be scanned
j. Normalizes textual endings so found in dictionary
k. Matches undirected subgraphs and counts weighed edges for partial ordering
l. Partial orders determined by possibilities as described in NC 100222
m. Checks for "longest" semantic labels for G(V, E)
n. Computes weights of concatenated labels heuristically for speedup o. Can be integrated with Raytheon's commercial decision support systems p. <format>Can support DHS and DTRA needs, intelligence message traffic (e.g., Human Intelligence reports (HUMINT)), open source intelligence (OSINT), Coalition Chat, Significant Activity Reports (SIGACTs), email searches, and the Semantic Web q. <format>Uses undirected graph-based reasoning to reduce data to knowledge (randomization)

The methodology described herein is eminently practical as has been previously outlined. Moreover, alternatives to this methodology necessarily take the form of "improvement inventions" because the disclosed methodology is based on an algorithm for the unsupervised learning of lexicons. Possible improvements include, but are not necessarily limited to (a) better or domain-specific search heuristics, (b) associated increases in the moving window size, and (c) improvements in parallel and/or distributed processing realizations Some or all of the steps of the present invention may be stored on a computer readable storage medium, wherein the steps are represented by computer readable programming code. The steps of the method may also be computer-implemented using a programmable device, such as a computer-based system. The method may comprise instructions that, when loaded into a computer-based system, cause the system to execute the steps of the method. The method may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

From the above description, it is apparent that various techniques may be used for implementing the concepts of the present invention without departing from its scope. The described embodiments are to be considered in all respects as illustrative and not restrictive. It should also be understood that system is not limited to the particular embodiments described herein, but is capable of many embodiments without departing from the scope of the claims.

What is claimed is:

1. A computer-implemented iterative semantic search method for searching words on a document, the method comprising the steps of:
    scanning a document containing a sequence of document words broken into a sequence of moving document windows formed by contiguous sentences on the document;
    forming a query containing a sequence of query words broken into query windows representing queries about the contents of the scanned document;
    a normalizer step responsive to the query for converting the various forms of each word to its normal form, where its meaning is mostly preserved by the surrounding context;
    a lexicon step for providing synonyms defined by repetition and locality of reference for any normalized word;
    a repository step for storing and indexing each of the synonyms for a defined window size;
    a parser step for building undirected graphs represented by edges and vertexes using a specified number of sentences from the document;
    a heuristics step for taking as an input the current success in growing graphs and producing as an output the size of the moving window for use by the parser;
    a randomizer step for reducing required storage and search time by removing duplicate sub-graphs and embedded sub-graphs from the storage repository;
    a cache step for applying temporal and spatial locality for subsequent queries; and
    a graph search algorithm step, which rank orders matching graphs for the query sub-graphs, if any, on the basis of matching sub-graphs.

2. The method of claim 1 including the step of modifying the query.

3. The method of claim 2 including the step of changing the document.

4. The method of claim 3 wherein the lexicon step maintains document edge counts and each edge is assigned a weight.

5. The method of claim 4 wherein the graph search algorithm step compares summed edge weights for each window in the document.

6. The method of claim 5 wherein the normalizer step is converting the various forms of each word to its normal form, which is defined to be the first form found in the dictionary.

7. The method of claim 6 wherein the repository step for storing and indexing each of the synonyms for a defined window size allows a user to customize lexicons for different applications.

8. The method of claim 7 wherein the randomizer step for reducing includes minimizing storage and search time by removing duplicate sub-graphs and embedded sub-graphs from the storage repository.

9. A computer-implemented iterative semantic search method for searching words on a document where the document contains a sequence of document words broken into a sequence of moving document windows formed by contiguous sentences on the document, the method comprising the steps of:
    a normalizer step responsive to a query about the contents of the document for converting the various forms of each word to its normal form, where its meaning is mostly preserved by the surrounding context;
    a lexicon step for providing synonyms defined by repetition and locality of reference for any normalized word;
    a repository step for storing and indexing each of the synonyms for a defined window size;
    a parser step for building undirected graphs represented by edges and vertexes using a specified number of sentences from the document;
    a heuristics step for taking as an input the current success in growing graphs and producing as an output the size of the moving window for use by the parser;
    a randomizer step for reducing required storage and search time by removing duplicate sub-graphs and embedded sub-graphs from the storage repository;

a cache step for applying temporal and spatial locality for subsequent queries; and a graph search algorithm step, which rank orders matching graphs for the query sub-graphs, if any, on the basis of matching sub-graphs.

10. The method of claim 9 including the step of modifying the query.

11. The method of claim 10 including the step of changing the document.

12. The method of claim 11 wherein the lexicon step maintains document edge counts and each edge is assigned a weight.

13. The method of claim 12 wherein the graph search algorithm step compares summed edge weights for each window in the document.

14. The method of claim 13 wherein the normalizer step is converting the various forms of each word to its normal form, which is defined to be the first form found in the dictionary.

15. The method of claim 14 wherein the repository step for storing and indexing each of the synonyms for a defined window size allows a user to customize lexicons for different applications.

16. The method of claim 15 wherein the randomizer step for reducing includes minimizing storage and search time by removing duplicate sub-graphs and embedded sub-graphs from the storage repository.

* * * * *